(12) United States Patent
Williamson et al.

(10) Patent No.: US 9,223,757 B2
(45) Date of Patent: Dec. 29, 2015

(54) AUTOMATED PARAGRAPH LAYOUT

(75) Inventors: David E. Williamson, Redmond, WA (US); Eric A. Menninga, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1864 days.

(21) Appl. No.: 11/672,883

(22) Filed: Feb. 8, 2007

(65) Prior Publication Data
US 2008/0282149 A1   Nov. 13, 2008

Related U.S. Application Data

(60) Division of application No. 10/402,785, filed on Mar. 28, 2003, now Pat. No. 7,191,396, which is a continuation of application No. 10/181,882, filed as application No. PCT/US00/35134 on Dec. 22, 2000, now Pat. No. 7,197,695.

(60) Provisional application No. 60/252,863, filed on Nov. 22, 2000.

(51) Int. Cl.
*G06F 17/21* (2006.01)

(52) U.S. Cl.
CPC ............ *G06F 17/211* (2013.01); *G06F 17/212* (2013.01)

(58) Field of Classification Search
CPC .............................. G06F 17/211; G06F 17/212
USPC ........................... 715/234, 243, 244, 254, 255
See application file for complete search history.

(56) References Cited

U.S. PATENT DOCUMENTS

| | | | |
|---|---|---|---|
| 3,654,611 A | 4/1972 | Bluethman et al. | |
| 4,054,948 A | 10/1977 | Grier et al. | |
| 4,575,813 A | 3/1986 | Bartlett et al. | |
| 4,587,631 A | 5/1986 | Nielsen et al. | |
| 4,608,664 A | 8/1986 | Bartlett et al. | |
| 4,783,760 A | 11/1988 | Carosso | |
| 5,224,038 A | 6/1993 | Bespalko | |
| 5,404,436 A | 4/1995 | Hamilton | |
| 5,438,512 A | 8/1995 | Mantha et al. | |
| 5,546,520 A | 8/1996 | Cline et al. | |
| 5,579,467 A | 11/1996 | Capps | |
| 5,625,773 A | 4/1997 | Bespalko et al. | |
| 5,634,064 A | 5/1997 | Warnock et al. | |
| 5,706,462 A * | 1/1998 | Matousek | 711/118 |
| 5,784,008 A | 7/1998 | Raguseo | |
| 5,835,920 A | 11/1998 | Horton | |

(Continued)

OTHER PUBLICATIONS

Hirschberg et al., *Journal of the Association for Computing Machinery*, 1987, 34(3):616-625.

(Continued)

*Primary Examiner* — Kyle Stork
(74) *Attorney, Agent, or Firm* — Wolfe-SBMC

(57) ABSTRACT

Methods and apparatus for calculating paragraph layout. A method begins with a first node in a paragraph and calculates an optimal line break scheme for paragraph layout that ended in the node. For every subsequent node in the paragraph, the method calculates an optimal line break scheme for paragraph layout that ends respectively in every subsequent node. Each optimal line break scheme is calculated by minimizing the total of a penalty value of a current line and all preceding penalties of all preceding lines. The preceding penalties of all preceding lines are defined by a previously calculated optimal line break scheme.

15 Claims, 9 Drawing Sheets

(56) References Cited

U.S. PATENT DOCUMENTS

| | | | |
|---|---|---|---|
| 5,860,073 | A | 1/1999 | Ferrel et al. |
| 5,956,737 | A | 9/1999 | King et al. |
| 5,978,819 | A | 11/1999 | Berstis |
| 6,003,048 | A | 12/1999 | Fallside |
| 6,018,749 | A | 1/2000 | Rivette et al. |
| 6,032,163 | A | 2/2000 | Tou et al. |
| 6,044,383 | A | 3/2000 | Suzuki et al. |
| 6,128,633 | A | 10/2000 | Michelman et al. |
| 6,175,845 | B1 | 1/2001 | Smith et al. |
| 6,189,020 | B1 | 2/2001 | Shimizu |
| 6,223,191 | B1 | 4/2001 | Truelson |
| 6,279,018 | B1 | 8/2001 | Kudrolli et al. |
| 6,510,441 | B1 | 1/2003 | Kenninga |
| 6,647,533 | B1 | 11/2003 | Liu et al. |
| 6,766,495 | B1 | 7/2004 | Bates et al. |
| 6,948,119 | B1 | 9/2005 | Farmer et al. |

OTHER PUBLICATIONS

Knuth et al., *Software—Practice and Experience*, 1981, 11:1119-1184.

Valvano, "Developing Software in Assembly Language First in First Out Queue", Dec. 1999, http://www.ece.utexas.edu/~valvano/assembly/fifo.htm, pp. 1-4.

Iwai, et al. "A Document Layout System Using Automatic Document Architecture Extraction", ACM SIGCHI Bulletin, vol. 20, Issue Si, Mar. 1989 pp. 369-374.

Knuth et al., "Breaking Paragraphs into Lines," *Software-Practice and Experience*, vol. 11 pp. 1119-1184, Feb. 1981.

Peels, et al. "Document Architecture and Text Formatting", ACM Transactions on Information Systems (TOIS), vol. 3, Issue 4, Oct. 1985, pp. 347-369.

Stephens, "Ready-to-Run, Visual Basic Algorithms," Second Edition, *Wiley Computer Publishing*, pp. 117-153, 155-185.

URW hz-program, "Micro-typography for advanced typesetting," *URW Software & TypeGmbH*Hamburg, Germany, 1993, 1-38.

Diehr, et al. "Optimal Pagination of B-trees with Variable-Length Items", Commun. ACM, vol. 27, No. 3, Mar. 1984, pp. 241-247.

Larmore, et al. "Efficient Optimal Pagination of Scrolls" Commun. ACM, No. 28, vol. 8, Aug. 1985, pp. 854-856.

McCreight, "Pagination of B*-trees with Variable-Length Records", Commun. ACM, vol. 20, No. 9, Sep. 1977, pp. 670-674.

* cited by examiner

AUTOMATED PARAGRAPH LAYOUT

CROSS-REFERENCE TO RELATED APPLICATIONS

This application is a divisional of U.S. application Ser. No. 10/402,785, filed Mar. 28, 2003, which is a continuation of U.S. application Ser. No. 10/181,882, filed Jul. 22, 2002, which was the National Stage of International Application No. PCT/US00/35134, filed Dec. 22, 2000, which claims priority to U.S. Provisional Application No. 60/252,863, filed Nov. 22, 2000. This application claims priority from each of the above-referenced applications, each of which is incorporated herein by reference.

BACKGROUND

The invention relates to techniques for automated paragraph layout.

Paragraph layout in a document production application involves selection and placement of line breaks to produce a visually pleasing appearance within a paragraph cell that defines the space allotted for the paragraph. Changes in the style of the text, e.g., fonts, formats, line heights, and point size, can complicate the task, particularly when layout is performed within non-rectangular shapes. In addition, text styles and shape complexity can significantly increase computational overhead and processing time.

A number of techniques exist for automated paragraph layout. Many implement a line-by-line approach. Line-by-line techniques generally start with a first line, assign penalty values for possible breaks in that line, and choose the best possible line break for that line. After the first line is defined, a second line is analyzed and defined in a similar manner. Line-by-line techniques continue through a paragraph, defining each line and moving on to the next. Although these techniques minimize penalty values for each line, they may not optimize paragraph layout because the cumulative result of each collection of line breaks is never considered.

One type of more sophisticated technique for automated paragraph layout involves the formulation of a tree structure representing all possible lines for a given paragraph. This type of technique assigns a penalty value to each possible line, and picks a path through the tree with the lowest cumulative penalty. Although this is generally effective, it is very time and memory-intensive. Extensive use of system resources and protracted processing time is generally undesirable in document production, especially in light of the increasing complexities of document content.

Still other techniques make use of dynamic programming and failure functions to create algorithms that run in linear time with one backward pass through the text. See D. S. Hirschberg and L. L. Lamore, "New Applications of Failure Functions," *Journal of the Association for Computing Machinery*, vol. 34, no. 3, July 1987. These dynamic programming techniques are generally less memory-intensive and very quick compared to the tree structure techniques. Complex shapes can undermine the effectiveness of such techniques, however, limiting their general application to paragraph layout. In particular, the Hirschberg/Lamore approach has proved inapplicable for shapes that deviate from a constant line width.

SUMMARY OF THE INVENTION

The invention provides systems, methods, and apparatus, including computer program apparatus embodied on computer-readable media, for automated paragraph layout. In an exemplary implementation, a process begins with a first node in the reading order of a paragraph and calculates an optimal line break scheme for a paragraph layout that ends with the node. The term "node" will be used to refer to an unbreakable segment of characters (e.g., a syllable in the English language). The phrase "line break scheme" for paragraph layout will be used to refer to a collection of line breaks in a paragraph. For every subsequent node in the paragraph, the process calculates an optimal line break scheme for a paragraph layout that ends with that subsequent node. Each optimal line break scheme is calculated by minimizing the total of a penalty value of a current line and all preceding penalties of all preceding lines. The preceding penalties of all preceding lines are defined by a previously calculated optimal line break scheme.

By calculating optimal line break schemes for each node in the paragraph, the process compiles data that is used to calculate the optimal line break schemes for subsequent nodes in the paragraph. Each optimal line break scheme associated with each node may define the most visually pleasing layout as determined by penalty values.

As the process analyzes each node, potential last lines are considered. As each potential last line is considered, the potential end of the preceding line is defined as the node immediately preceding first node of the potential last line. However, an optimal line break scheme associated with the node immediately preceding the first node of the potential last line was already calculated. Therefore, the optimal line break scheme for the whole paragraph is calculated by minimizing the collective penalty values of a potential last line and the previously calculated optimal line break scheme of a paragraph that ended with the node immediately preceding the start node of the potential last line.

After analyzing each node in the paragraph, the paragraph may be formatted in accordance with the optimal line break scheme of the last node in the paragraph. The formatted paragraph can then be displayed, e.g., on a computer screen, or printed onto print media. Alternatively, the process can be repeated for one or more additional paragraphs. Then, after formatting a finite number of paragraphs, the collection of formatted paragraphs can be displayed or printed.

When one or more line widths for an allotted paragraph space vary, it may be necessary to know the different line widths to calculate an optimal layout. Thus, in another implementation, the process calculates one or more line widths. Line width data may then be used to calculate optimal line break schemes for paragraph layout. In this manner, calculating line widths permits automated paragraph layout in irregular (e.g., non-rectangular) shapes.

In another implementation, the process re-calculates one or more optimal line break schemes when the width of a line is less than a width of a line immediately preceding it. In particular, when a subsequent line has a width dramatically smaller than the preceding line, re-calculating optimal line break schemes for previous nodes may be necessary to find the optimal line break scheme for the paragraph.

In still another implementation, the process maintains an index of candidate nodes that may be the start node of a given last line. The index may be held in a queue and the queue may be a deque (double ended queue). The index is adjusted as the process considers nodes during processing. In this manner, a node is removed from the index when it is clear that starting a last line with that node would never yield an optimal paragraph. Removing nodes from the index can increase the speed at which a paragraph can be analyzed and formatted.

In one or more implementations of the invention, the process operates without the use of a "bridge function." Some dynamic algorithms use what is referred to as a "bridge function" or "Boolean function bridge" to remove candidates from a queue. While a bridge function could be used, the added complexity is not necessary for many implementations of the invention.

In yet another implementation a process calculates node widths. A base width can define the width of a node either in terms of the distance from the beginning of the node to the end of the node, or the base width can define the width of the node in terms of the distance from the beginning of the text to the end of the node. One or more correction widths may account for one or more adjustments to the width of the node if the node begins a line or if the node ends a line. After calculating node widths, the length of a line consisting of a sequence of nodes can be calculated.

When a particular line is broken into more than one tile, additional challenges arise. In an additional implementation, a process analyzes multi-tile lines differently than lines having a single tile. When a number of nodes are received for layout on a multi-tile line, a number of different candidate line penalties are calculated. Each candidate line penalty is associated with a unique layout of the nodes on that line. The line penalty for that line, then, can be determined as the minimum candidate line penalty.

The details of one or more implementations of the invention are set forth in the accompanying drawings, the description below, and the exemplary pseudo-code. Other features, objects, and advantages of the present invention will be apparent from the description, drawings, pseudo-code, and from the claims.

DETAILED DESCRIPTION

Figure 1:
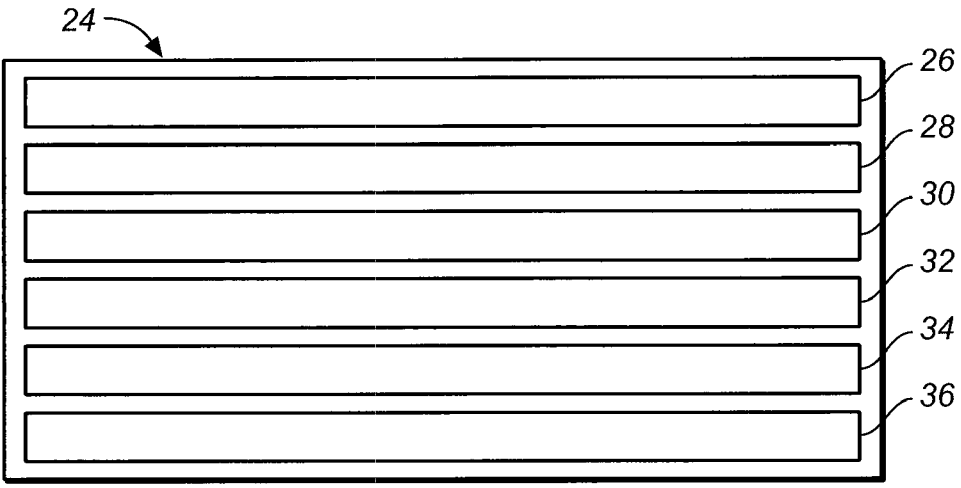
FIG. 1 is a diagram illustrating a series of constant-length lines for paragraph layout.

FIG. 1 illustrates a series of constant-length lines for a paragraph layout. As shown in FIG. 1, a paragraph cell 24 defines an area in which one or more lines 26, 28, 30, 32, 34, 36 may reside. Paragraph cell 24 may be positioned within a page of imagery, e.g., for print reproduction such as on paper or film or electronic presentation such as on a web page. Each line 26, 28, 30, 32, 34, 36 extends horizontally across paragraph cell 24. The sequence of lines 26, 28, 30, 32, 34, 36 extend vertically downward through paragraph cell 24. The height and shape of the characters positioned within the cell 24 may define the respective heights of the different lines 26, 28, 30, 32, 34, 36. For this reason, the characters may define both the size of lines 26, 28, 30, 32, 34, 35, and the number of lines that will fit in cell 24.

Figure 2:
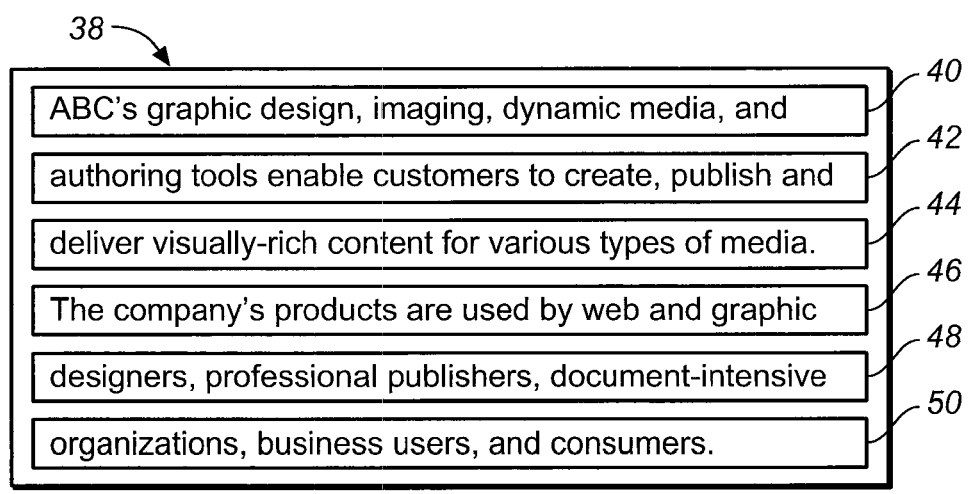
FIG. 2 is a diagram illustrating incorporation of text within the lines shown in FIG. 1 according to a possible paragraph layout.

FIG. 2 illustrates placement of text in a series of lines 40, 42, 44, 46, 48, 50. In the examples of FIGS. 1 and 2, each line has a common, constant length. Therefore, each line of text has the same maximum length when considering paragraph layout. One key to automated paragraph layout is establishing a paragraph layout scheme that defines the line breaks of the paragraph in a manner that promotes a visually pleasing layout.

Penalty values can be calculated and used to differentiate visually pleasing paragraph layouts from less desirable ones. A penalty value may take a number of factors into consideration. For instance, a penalty value may take into account such things as letter size, word spacing, letter spacing, changes in word or letter format, and hyphenation. In addition, paragraph consistency may affect a penalty value. For instance, an increased penalty can be assigned to a line with narrow word spacing if it immediately follows a line with wide word spacing.

Hyphenation may affect a penalty value in several different ways. For instance, a penalty value may take into account where a particular hyphenation is occurring within an individual word, assigning greater penalties to less desirable hyphenation. In addition, repetitive hyphenation within a paragraph may further increase a penalty value. Moreover, hyphenating particular words, such as the last word on a page, may increase a penalty value.

Figure 3:
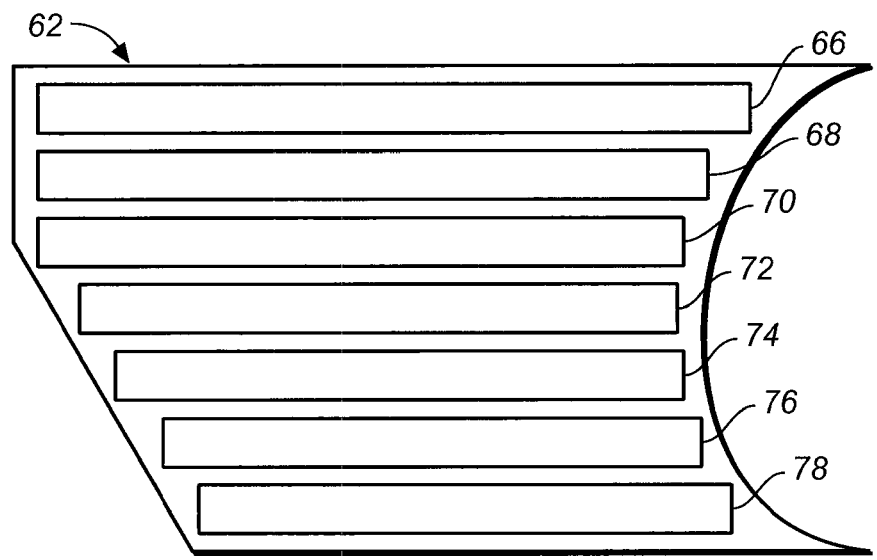
FIGS. 3 and 4 are exemplary diagrams illustrating two scenarios having a series of varied-length lines disposed for paragraph layout.
Figure 4:
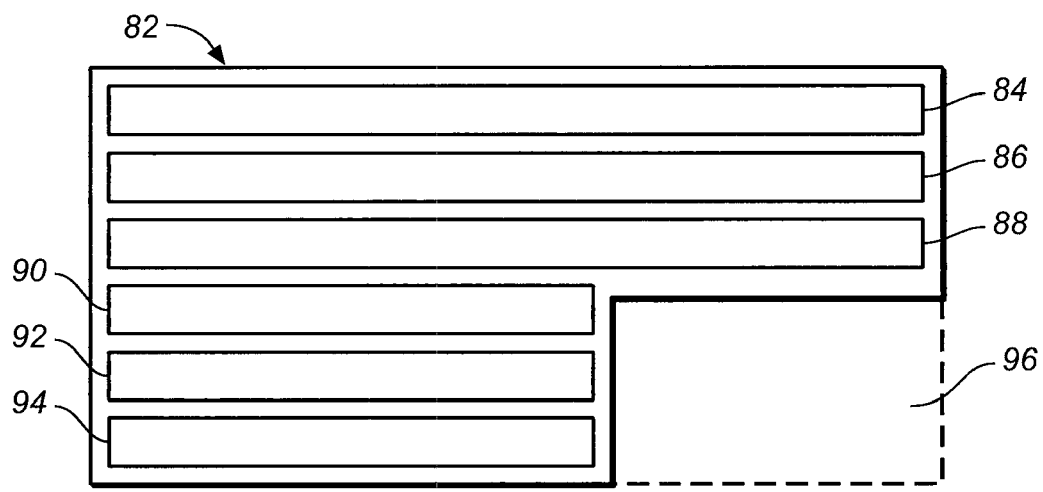

With constant-length lines, paragraph layout is straightforward and predictable. However, when a paragraph cell contains varied-length lines, complexity of paragraph layout can increase. Indeed, some paragraph layout techniques do not work well with varied-length paragraph lines. FIGS. 3 and 4 illustrate a paragraph cell having a series of varied-length lines disposed in a paragraph layout. In FIG. 3, a series of lines 66, 68, 70, 72, 74 76, 78 have lengths that vary according to the shape of cell 62. In FIG. 4, a series of lines 84, 86, 88, 90, 92, 94 have lengths that vary according to the shape of cell 82. Space 96 may define a space for alternative imagery such as non-text, or may simply define some space allotted to some other textual or non-textual imagery.

In an exemplary implementation, a process in accordance with the invention generally implements a linear beginning-to-end pass through the text of a paragraph. A node is an unbreakable segment of one or more characters (e.g., typically a syllable in the English language, although words or phrases could be defined as unbreakable). For each node in the paragraph, an optimal line break scheme for paragraph layout ending in that node is calculated. The phrase "optimal line break scheme for paragraph layout" is used to refer to the most visually pleasing collection of line breaks in a paragraph, as determined by penalty values. As the process moves to consider subsequent nodes, the previously calculated optimal line break schemes for paragraph layouts, provide data that facilitates subsequent calculations. No line's content is defined until the process has considered every node in the paragraph. The last node in the paragraph, then, defines a last line that starts with a start node calculated by the process to produce an optimal line break scheme for paragraph layout. That calculated start node also defines the end of the second to last line because the nodes are placed sequentially in the paragraph layout.

Many of the exemplary implementations described in this specification are described in the context of the English language. In English, characters are read from left to right on horizontal lines beginning with the top line. A process in accordance with the invention, however, may be implemented for other languages as well. In some languages, for instance, characters are read from right to left on horizontal lines. And in still other languages characters are read from top to bottom on vertical lines. A process in accordance with the invention is equally effective in these and other contexts. For instance, the process may progress through the characters, nodes, words, or phrases of a paragraph, in the reading order of that paragraph, as defined by the particular language.

Figure 5:
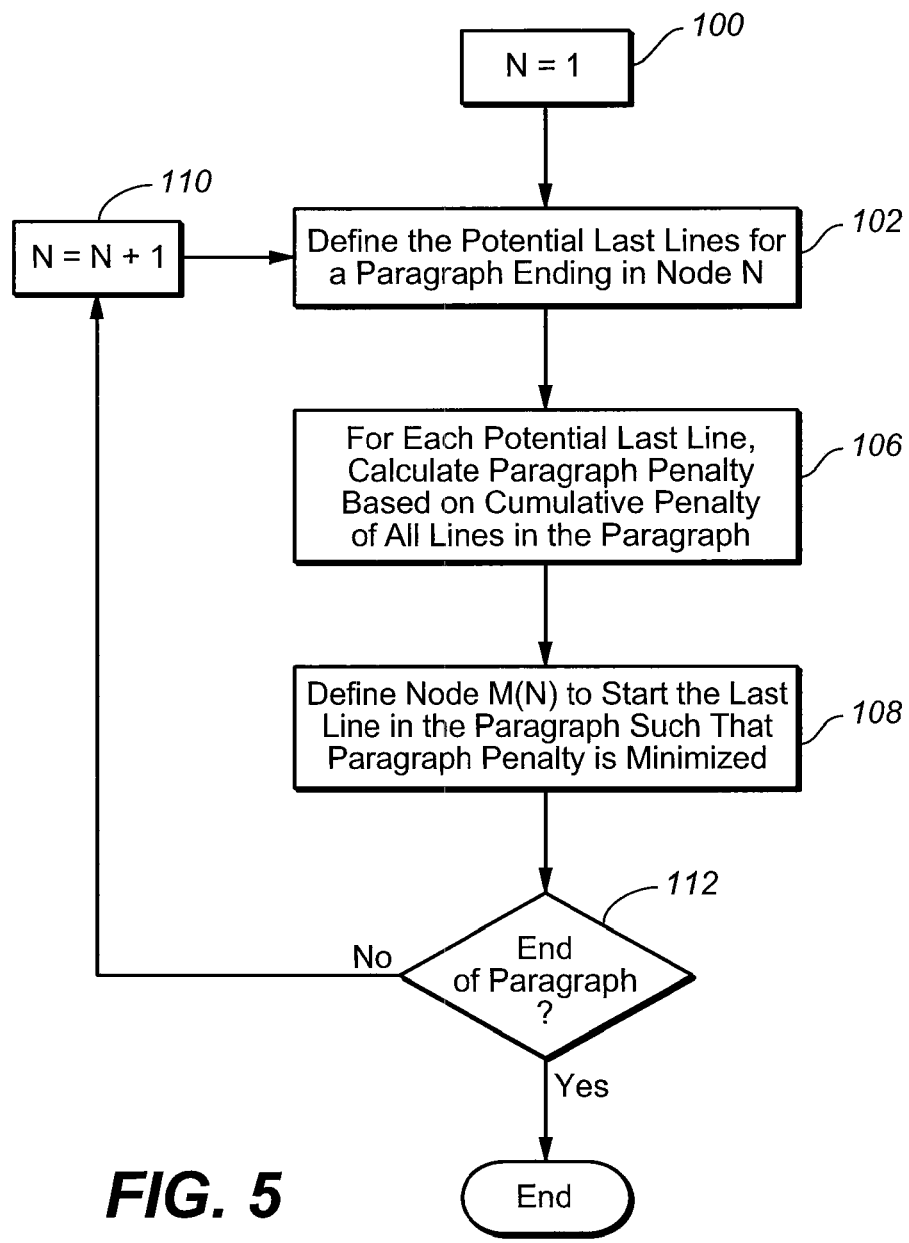
FIGS. 5-7 are flow diagrams illustrating exemplary implementations of automated paragraph layout.

In one Japanese example, nodes are read from left to right on horizontal lines starting at the top of the page. However, in other Japanese texts, nodes may be read from top to bottom starting with the nodes in the rightmost line. In accordance with the invention, the process begins with the first node in reading order of the text. Thus, in Japanese, the process may begin either with the node in the upper right hand corner or the node in the upper left hand corner, depending on how the particular text is read. The process then considers the subsequent nodes in reading order, as described in detail below, and ultimately defines the optimal paragraph layout FIG. 5 illustrates one implementation of a process in accordance with the invention. Beginning with the first node (defined at 100), one or more potential last lines for a paragraph ending in that ending node are defined (102). For instance, defining one or more potential last lines may simply involve defining or adjusting an index of candidate nodes that will be considered as possible start node of the last line. Because each node in the index is unique, each node in the index may define a unique last line of a paragraph that ends with the same ending node. For each potential last line, a paragraph penalty is calculated (106). The respective paragraph penalties are each based on the cumulative penalty of all lines in the paragraph. Node M(N) is defined as the node that starts the last line in a paragraph ending in node N such that paragraph penalty is minimized (108). This process is then repeated for subsequent nodes (110) until the end of the paragraph is reached ("yes" branch from decision step 112).

As the process analyzes each subsequent node, potential last lines are defined for a paragraph that ends in that node (102). Again, defining one or more potential last lines may simply involve defining or adjusting an index of candidate nodes that will be considered as the possible start node of the last line. For each potential last line that is considered, a paragraph penalty is calculated based on the cumulative penalty of all lines in the paragraph (106). The cumulative paragraph penalty is calculated by first calculating a last line penalty for the potential last line. Defining each potential last line also defines the potential end of the preceding line. An optimal line break scheme for paragraph layout ending in each respective potential node that may end the preceding line was already calculated. Therefore, the optimal line break scheme for the whole paragraph can be determined by minimizing the collective penalty values of a potential last line and the previously calculated optimal line break scheme for paragraph layout associated with the node that ends the second to last line. After this determination is made, node M(N) is defined as the node that starts a last line of a paragraph ending in node N (108). In this manner, Node M(N) is defined such that the penalty for the whole paragraph is minimized.

Figure 6:
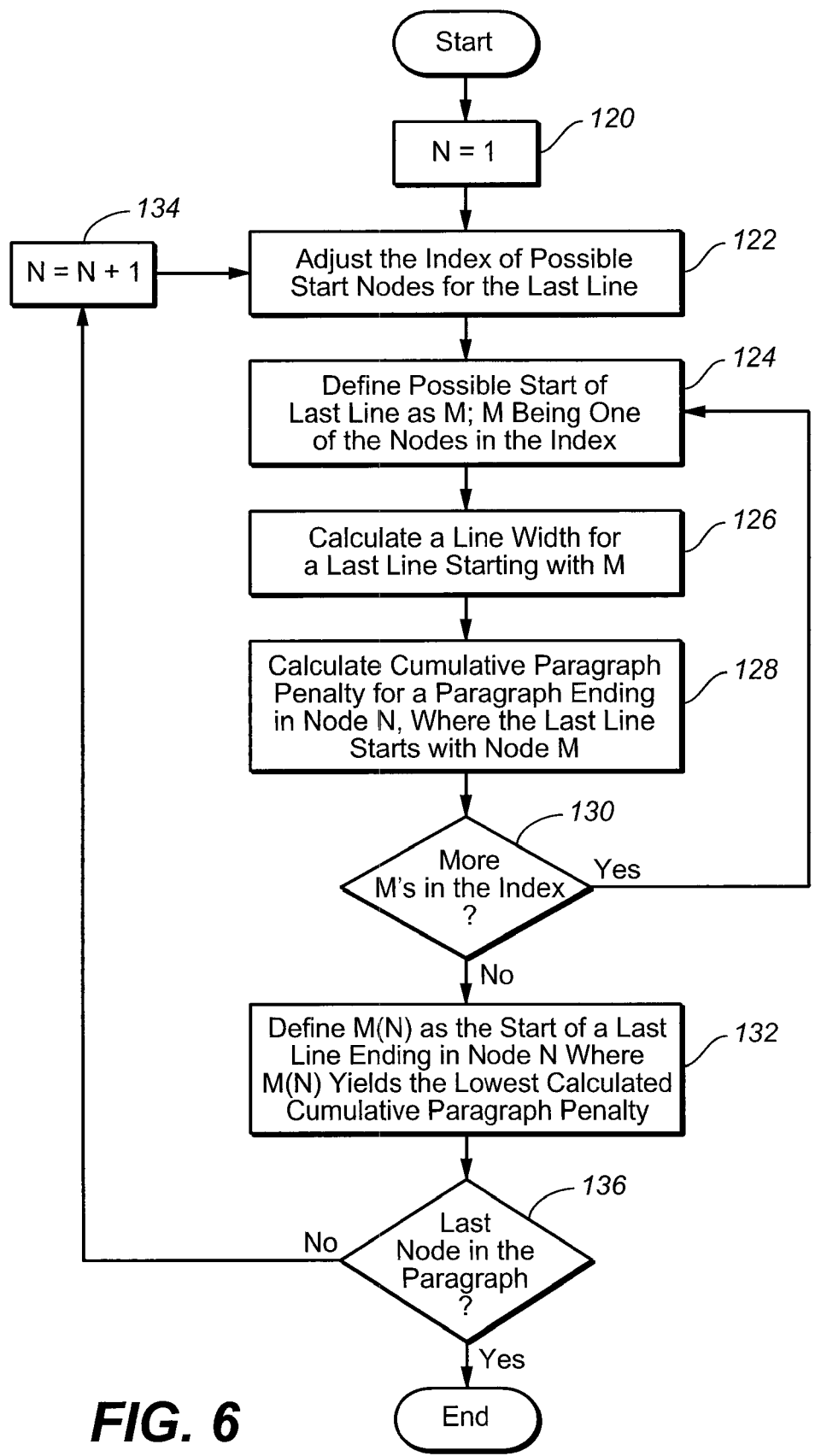

FIG. 6 illustrates another implementation of a process in accordance with the invention. Beginning with the first node (defined at 120), a paragraph ending in that node is considered. At this point, an index of the possible start nodes for the last line is adjusted (122). The index is simply a list of nodes that will be considered as the potential start node of the last line. This index of nodes may be held, for instance, in a stack, a queue, or a deque (a double ended queue). Adjusting the index may involve inserting or removing candidate nodes from index. For instance, if the index is a deque, the candidate start nodes may be held in reading order in the deque. The candidate node that comes earliest in the reading order of the paragraph may be located at the bottom of the deque and the candidate node that comes last in reading order of the paragraph may be located at the top of the deque. Nodes can be removed from top of the deque by a "pop," or removed from the bottom of the deque by a "drop." Nodes can be inserted at the top of the deque by a "push." The pseudo-code below provides an example of these functions.

By adjusting the index (122), various nodes can be removed from consideration if, for instance, they would never begin an optimal last line. In this manner, adjusting the index (122) can increase the speed at which a paragraph can be analyzed and formatted. After the index has been adjusted (122), a possible start of a last line is defined by one of the nodes in the index (124). At this point, the line width for a last line starting with the possible start node can be calculated (126). As discussed in more detail below, calculating the width of the last line can facilitate paragraph layout for irregular shaped paragraph cells.

For each potential last line associated with a paragraph ending in node N, a cumulative paragraph penalty is calculated (128). After every possible last line start node, M, associated with a paragraph ending in node N has been considered (130), a start node M(N) is defined as the start node of a last line ending in Node N. M(N) defines the start node of the last line of a paragraph ending in node N such that the cumulative paragraph penalty of the whole paragraph is minimized (132). The whole process is then repeated and subsequent paragraph nodes (134) are analyzed as the ending node of a paragraph. The process repeats until the last node in the paragraph has been considered (yes branch of 136). After every node in the paragraph has been considered, the M(N) associated with the last node in the paragraph defines the paragraph's optimal line break scheme. The paragraph may then be formatted and displayed or printed in accordance with the paragraph's optimal line break scheme. Alternatively, the process can be repeated for one or more additional paragraphs.

A process in accordance with the invention generally performs a linear beginning-to-end pass through the text of a paragraph. However, to handle some special cases, a slight deviation from purely linear operation may be implemented to generate an optimal paragraph layout. One instance where a deviation from purely linear operation may be advantageous is where the width of the last line is less than the width of the line immediately preceding it. Referring again to FIG. 4, if a last line were associated with line 90, a deviation from purely linear operation might be necessary to generate an optimal paragraph layout because line 88 is longer than line 90. Moreover, as the difference between width of a last line and the preceding line increases, so does the potential need to deviate slightly from linear operation. A threshold difference or threshold ratio between the width of a last line and the preceding line can be defined to determine when deviation from linear operation will be applied.

The reason that a deviation from linear operation may be necessary can be understood with the following background. In some implementations, as the process considers candidate nodes in the index (e.g., the deque) for possible starts of a last line, it begins by considering the node on the bottom of the deque and considers subsequent nodes in the deque by moving upward through the deque towards the top (i.e., it begins with the node in the index that comes earliest in the reading order of the paragraph and considers subsequent nodes in the index in reading order). To increase processing speed, the system may stop considering nodes in the index as potential last line start nodes, when the line break scheme for paragraph layout associated with a particular last line start node has a penalty greater than the line break scheme for paragraph layout associated with a previously considered last line start node. In other words, as the process considers potential start nodes in the index, it may consider those nodes only as long as the line break scheme's penalty is decreasing. As soon as it increases, the process moves on to consider subsequent ending nodes. This optimization can increase processing speed.

However, when a last line is much smaller than the line immediately preceding it, implementations that include the feature described above can encounter problematic scenarios. For instance, a subsequently-considered last line start node may have an associated paragraph penalty greater than a previously considered last line start node even though the optimal line break scheme for paragraph layout was not yet found.

Figure 7:
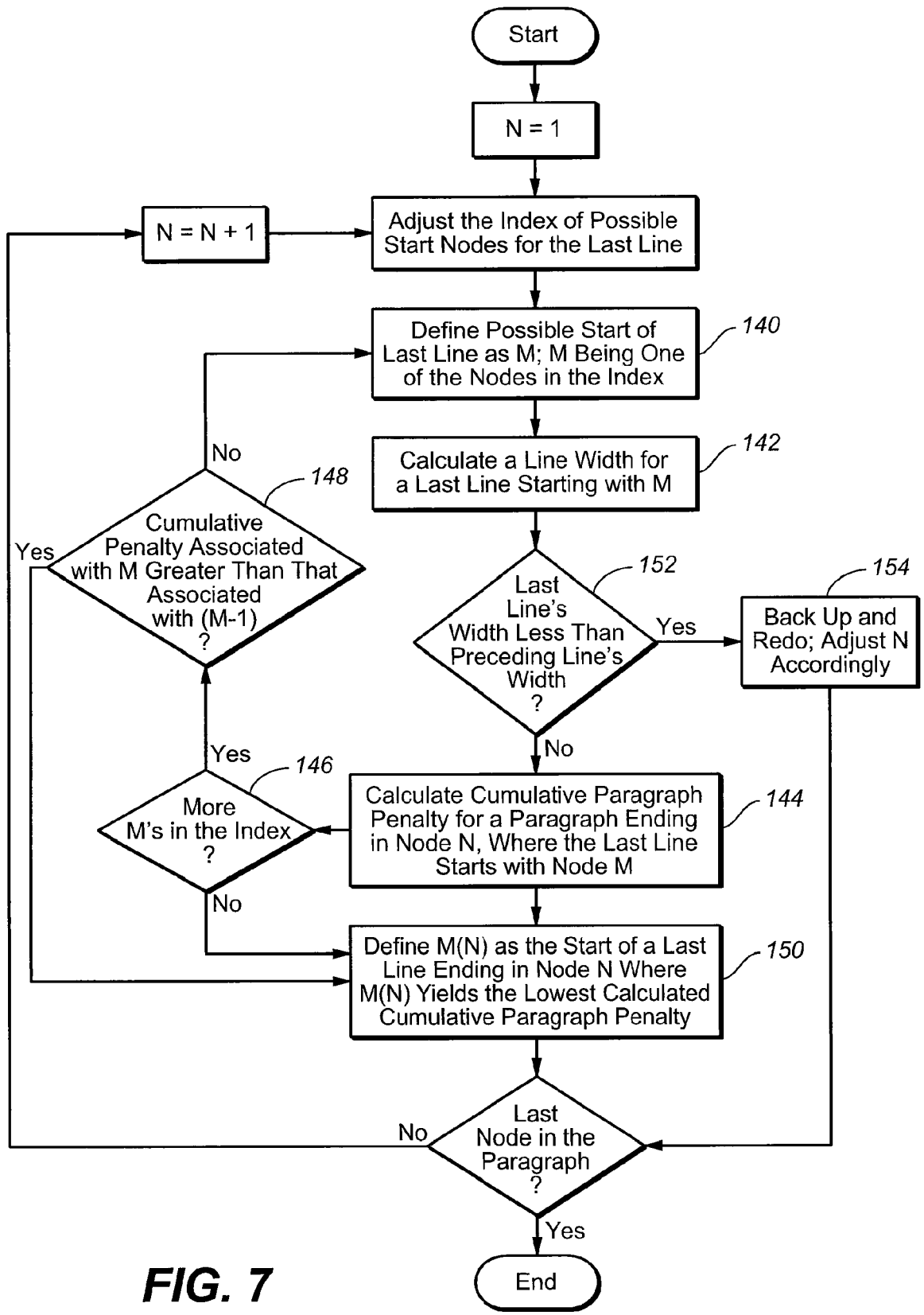

To handle this scenario and still realize the advantages of the above-described optimization, a process may be implemented to perform a correction function. The process can identify the potentially problematic case (e.g., a last line having a width less than the preceding line) and perform a correction function. In one implementation, the correction function forces the process to consider additional last line start nodes in the deque even though the line break scheme penalties have begun to increase. In another implementation (described in detail below), the process reconsiders nodes for which an optimal line break scheme for paragraph layout was already calculated FIG. 7 illustrates an implementation having both a feature that increases processing speed and a correction function. As shown in FIG. 7, as the process is considering potential last line start nodes, M (140, 142, 144, 146), it may consider additional last line start nodes from the index only as long as the line break scheme's penalty is decreasing (148). In most cases, as soon as the line break scheme's penalty begins to increase, the optimal line break scheme for paragraph layout was already identified. Therefore, M(N) is defined as the start of a last line ending in node N (150) without considering additional nodes in the index as possible last line start nodes. This feature can increase processing speed.

When the calculated width of a last line ending in a particular last line start node is less than the preceding line's width (152), however, a BackUp and Redo operation (154) is performed. An example of a BackUp and Redo operation is provided in the Exemplary Pseudo-Code below. As shown in the Pseudo-Code, the BackUp and Redo operation reconsiders previously considered nodes and continues to reconsider additional previously considered nodes as long as the paragraph penalty is improving. Node N may be adjusted accordingly after a BackUp and Redo operation is performed (154).

Referring again to FIG. 4, if a calculated last line's width is associated with line 90, for example, deviating from purely linear operation allows the process to reconsider previously considered nodes to find an optimal paragraph layout. When the nodes were previously considered, only paragraphs having nodes on line 88 and the lines before line 88 were analyzed. However, an optimal paragraph may actually place one or more previously considered nodes on short line 90. Therefore, when a shorter line 90 is identified, the previously considered nodes may be reconsidered as possible nodes ending last line 90. In this manner, the process ensures that the optimal paragraph layout is identified, and may do so deviating only slightly from purely linear operation.

Figure 8:
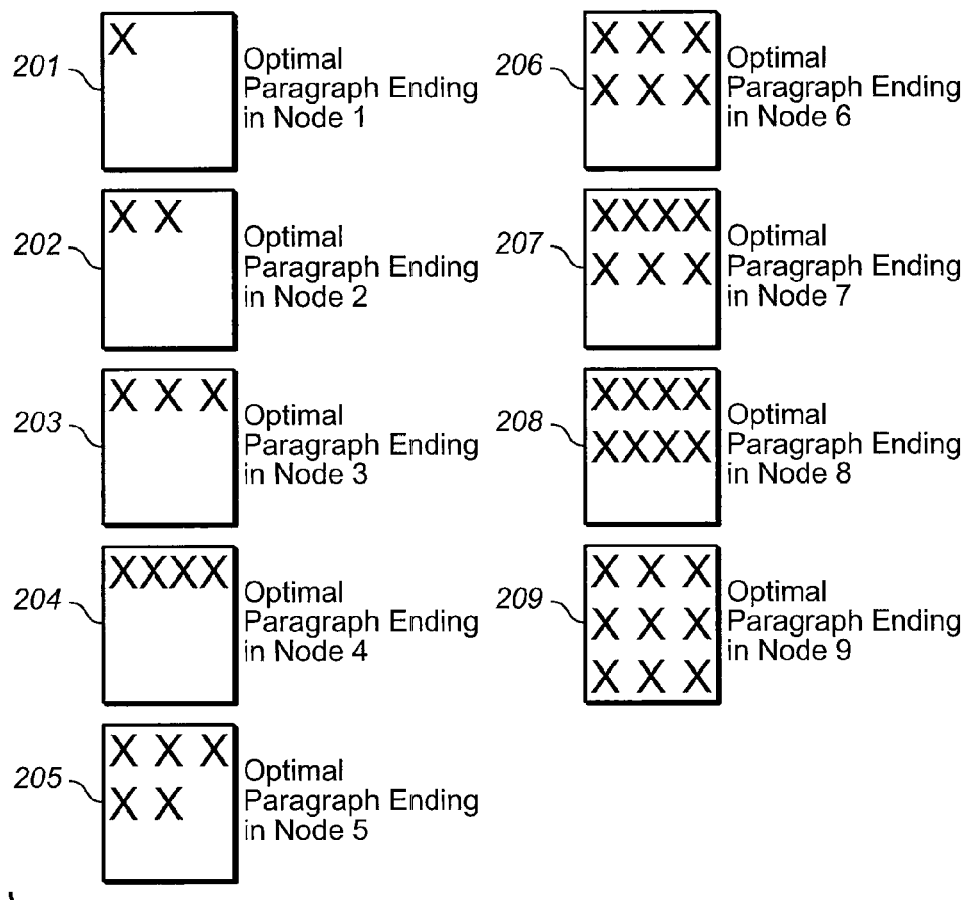
FIG. 8 is a series of illustrative diagrams showing potential output following each step of an exemplary process for automated paragraph layout.

FIG. 8 shows potential output following each step of an exemplary process for automated paragraph layout. FIG. 8 illustrates a hypothetical 9-node example formulated to show the dynamic operation of an implementation of the present invention.

When node 1 is considered, an optimal paragraph layout has one line containing node 1. Node 1 gets a back pointer to itself indicating the optimal start of line one. This yields a formatted paragraph ending in node 1 (see 201)

When node 2 is considered, an optimal paragraph layout may have one line beginning in node 1 and ending in node 2. Therefore, node 2 gets a back pointer to node 1 indicating the optimal start of a line ending in node two. This yields a formatted paragraph ending in node 2 (see 202).

When node 3 is considered, an optimal paragraph may have one line beginning with node 1 and ending in node 3. Therefore, node 3 gets a back pointer to node 1 indicating the optimal start of a line ending in node three. This yields a formatted paragraph ending in node 3 (see 203).

When node 4 is considered, putting node 4 on line one with nodes 1-3 may increase the penalty of line one. However, putting node 4 on line two by itself may yield an even higher paragraph penalty. Therefore, optimal paragraph layout ending in node 4 has nodes 1-4 on line one. Node 4 gets a back pointer to node 1 indicating the optimal start of a line ending in node 4. This yields a formatted paragraph ending in node 4 (see 204).

When node 5 is considered, an optimal paragraph ending in node 5 may have nodes 4-5 on line two and 1-3 on line one. Node 5 gets a back pointer to node 4 indicating the optimal start of a line ending in node 5. This yields a formatted paragraph ending in node 5 (see 205).

When node 6 is considered, an optimal paragraph ending in node 6 may have nodes 4-6 on line two and 1-3 on line one. Node 6 gets a back pointer to node 4 indicating the start of the line ending in node 6. This yields a formatted paragraph ending in node 6 (see 206).

When node 7 is considered, putting node 7 on line two with nodes 4-6 may increase the penalty significantly. Putting node 7 on line three by itself may also increase the penalty significantly. Although putting node 7 on line two with nodes 5-6 may increase the penalty of line one, it may yield the lowest cumulative penalty for the paragraph. Therefore, an optimal paragraph ending in node 7 has nodes 5-7 on line two and nodes 1-4 on line one. Node 7 gets a back pointer to node 5 indicating the optimal start of a line ending in node 7. This yields a formatted paragraph ending in node 7 (see 207). Interesting, although 205-206 have a line one with a penalty less than line one in 207, the cumulative paragraph penalty in 207 is minimized with a higher first line penalty.

When node 8 is considered, putting node 8 on line two with nodes 5-7 may increase the penalty. However, putting node 8 on line three either by itself or with node 7 may increase the penalty by an even greater amount. Thus, an optimal paragraph ending in node 8 has nodes 5-8 on line two and nodes 1-4 on line one. Node 8 gets a back pointer to node 5 indicating that the optimal start of a line ending in node 8. Node 8's back pointer, in turn defines node 4 as the last word in the previous line. This yields a formatted paragraph ending in node 8 (see 208). Again, although 206-207 have a line two with a penalty less than line two in 208, the cumulative paragraph penalty in 208 is minimized.

Finally, when node 9 is considered, putting node 9 on line three by itself may not increase the penalty of line three. However, putting node 7, 8 and 9 on line three may yield the lowest cumulative penalty. Therefore, optimal paragraph ending in node 9 has nodes 7-9 on line three. Node 9 gets a back pointer to node 7 indicating that the optimal start of a line ending in node 9 is node 7. Node 6's back pointer, in turn, defines the layout of lines two and one. This yields a formatted paragraph ending in node 9 (see 209).

The pseudo-code in the table below illustrates one exemplary implementation of the invention.

| EXEMPLARY PSEUDO-CODE |
| --- |
| Variables:<br>    Nodes = array of nodes of paragraph (e.g., syllables) in reading order<br>    S = deque, used to hold indexes of candidate nodes during processing<br>    n = number of nodes in paragraph<br>    f = array of cumulative penalty values (one per node)<br>    previousLineEnd = array of indexes of node that ends previous line (one per<br>        node)<br>Functions:<br>    \|S\| = current cardinality of S<br>    Top = value of the top element of S<br>    Bottom = value of the bottom element of S<br>    2Top = value of the second from the top element of S<br>    2Bottom = value of the second from the bottom element of S<br>    LineWidth(i, j) = width of line from i+1 node through j node (sum of width of<br>        nodes+ right adjustment of final node to account for hyphenation, trailing<br>        spaces, etc.)<br>    Height(i,j) = maximum of height[i+1], ..., height[j]; where i < j<br>    Penalty(i, j)<br>        // Calculates total penalty of paragraph with optimal line breaks ending<br>        //with the line i+1, j.<br>        if (j == n) and (LineWidth(i,j) <= TargetWidth(i,j) then<br>            // This "if" is for the typical case where the last line in a paragraph<br>            // can be of any length (less than the target width. To achieve<br>            // forced justification of the last line in the paragraph, remove the<br>            // "if-side" of this conditional.<br>            Penalty = f(i)<br>        else<br>            // This is a fairly arbitrary choice for a penalty function. A<br>            // typographically rich penalty function would take into account<br>            // many other factors e.g., hyphen ladders ranked hyphenation<br>            // points, short/long-ness of previous line, preferred length of last<br>            // line in paragraph, additional penalty for hyphenating last line on<br>            // a page, etc.)<br>            Penalty = 10 * (TargetWidth(i,j) − LineWidth(i,j))**2 + f(i) (+25,<br>            if node(j) ends with hyphen)<br>    MaxTargetWidth(i,j) = 2 * TargetWidth(i,j)<br>        The 2 constant is arbitrary. In an environment where a user can choose<br>        different paragraph alignments and specify min, max, desired amounts for<br>        variables like letter and word spacing, this value would be a function of<br>        those inputs.<br>    MinTargetWidth(i,j) = TargetWidth(i,j) / 3<br>        The "3" constant is arbitrary. In an environment where a user can choose<br>        different paragraph alignments and specify min, max, desired amounts for<br>        variables like letter and word spacing, this value would be a function of<br>        those inputs.<br>    TargetWidth(i,j)<br>        For a rectangular shape, this just returns the constant width of the<br>        rectangle. For a complex shape, it returns the width of a rectangle of<br>        Height(i,j) that is of the maximum width fully contained in the complex<br>        shape and is positioned with its top at the y offset of the preceding (i th)<br>        node, y[i].<br>    BackupAndRedo(i)<br>        This function is used to correct a situation caused by composing a narrow<br>        line after a wide line. The basic algorithm does not handle this case well.<br>        The function is specified below.<br>Procedures:<br>    Pop - delete the top element of S<br>    Drop - delete the bottom element of S<br>    Push(x) - insert x at the top of S<br>Main Process:<br>f[0] = 0<br>S = empty list<br>startOfLine = 0<br>for i from 1 up to n do<br>begin<br>    while S nonempty and LineWidth(Bottom, i) > MaxTargetWidth(Bottom, i) do<br>        Drop<br>    while LineWidth(startOfLine, i) >= MinTargetWidth(startOfLine, i) do<br>    begin<br>        while S nonempty and Penalty(startOfLine, i) <= Penalty(Top, i) do<br>            Pop |

EXEMPLARY PSEUDO-CODE

-continued

```
            if LineWidth(startOfLine, i) <= MaxTargetWidth(startOfLine, i) then
                Push(startOfLine)
            startOfLine = startOfLine + 1
        end
        while |S| >= 2
        begin
            if Penalty(2Bottom, i) <= Penalty(Bottom, i) then
                Drop
            else if TargetWidth(2Bottom, i) < TargetWidth(Bottom, i) then
                BackupAndRedo(i)
        end
        if S nonempty then
        begin
            previousLineEnd[i] = Bottom
            f[i] = Penalty(Bottom, i)
            y[i] = Height(Bottom, i) + y[Bottom - 1]
        end
        else
        begin
            prevousLineEnd[i] = 0
            f[i] = infinity
            y[i] = Height(0,i)
        end
end
    // n is the last node of the paragraph
if f[n] < infinity then
begin
    x = n
    while x != 0
            // while not at the beginning of the paragraph
    begin
        composeLines.ApplyComposedLine(previousLineEnd[x] + 1, x)
            // print/draw/save the line consisting of
            // the nodes from (previousLineEnd[x] + 1) to (x)
        x = previousLineEnd[x]
            // back up to previous line
    end
end
//--------------------------------------------------------------------------------------------------
function
BackupAndRedo(i)
begin
    newPenalty = Penalty(Bottom, i)
        // backup as long as the penalty is better starting on the next line
        // and do not backup before the beginning.
    while (i > 2Bottom) do
    begin
        lastPenalty = newPenalty;
        newPenalty = Penalty(2Bottom, i - 1)
        if newPenalty < lastPenalty
            i = i - 1;
        else
            break out of while loop
    end
    if i was decremented
    begin
        Drop            // do not count Bottom anymore
        while (Top >= i)   // everything from i on is to be redone
            Pop
        startOfLine = Top - 1;
    end
end
```

One problem that arises as a result of the dynamic features of the present invention relates to hyphenation and spacing at the end of a line. The ending nodes of the respective lines in the paragraph are not defined until the process has considered every node in the paragraph. For this reason, the width of one or more nodes that may end a given line may also be uncertain until the process has been completed. If a hyphenated word ends a line, a particular node will have a hyphen that increases the width of that node. However, if that particular node does not end the line, its width will not be increased by the presence of a hyphen. The presence or absence of the hyphen will, in part, determine the width of the particular node. Moreover, that particular node's width may affect the optimal paragraph layout.

Similarly, a node that ends a word may have a node width that accounts for the spacing between that word and the following word. However, if the node that ends a word also ends a line, the node width should not account for any spacing. For these reasons, a process in accordance with the invention may dynamically account for one or more node's widths. These respective widths can then be used as the process calculates the appropriate penalty values to determine an optimal paragraph layout. In this manner, the optimal paragraph layout will be defined using the appropriate nodes' widths whether or not the nodes that end particular lines change during the dynamic process.

Figure 9:
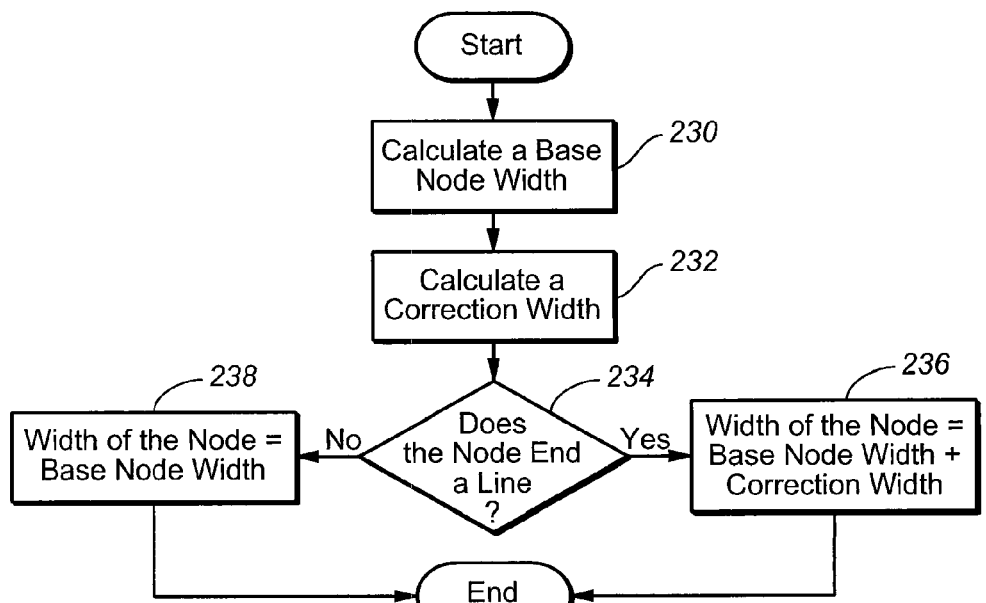
FIG. 9 is a flow diagram illustrating a process that accounts for one or more potentially varying node widths.

FIG. 9 illustrates an implementation of a process that accounts for one or more potentially varying node widths. As shown, a base node width associated with a node is calculated (230). For instance, the base node width may include character width components that take into account the widths of the respective characters that make up the node. In addition, the base node width may include additional components such as a kern pair component to account for variations in node widths that result when particular characters follow one another. For instance, in the English language when a capital A follows a capital W, e.g., "WA," a relatively large kern pair component may downwardly adjust the node width because the respective widths of the characters W and A overlap.

In addition to calculating a base node width, a correction width is also calculated (232). This correction width may account for one or more adjustments that should be accounted for when the node ends a line. For instance, the correction width may include a space adjustment component to ensure proper justification. If a last node of a word ends a line, the additional space following that word should not be considered as part of the last node's width, or improper justification of the line will occur. For this reason, the space adjustment component reduces the width of a node by the width of a space when that node is both the last node in a word and the last node in a line.

The correction width may also include a hyphenation adjustment component to adjust the node's width when that node is the hyphenated node of a hyphenated word. For instance, the node's width may be increased by the width of the hyphen and decreased to account for any kern pair adjustment involving the last character of the node and the hyphen.

After calculating a base node width and a correction width, the proper width may be used depending on where the node resides on a given line. If the node ends a line in the paragraph (yes branch of 234), a combination of the base node width and the correction width is used as the width of the node (236). However, if the node does not end a line in the paragraph (no branch of 234), then the base node width is used as the width of the node (238).

The notion of using a correction width can also be used to account for a beginning of a line adjustment, e.g., for a node that begins a line. If a node begins a line, the width of that node may require adjustment to account for justification. For instance, some paragraph layouts use what is referred to as "hanging punctuation." In layouts using hanging punctuation, if punctuation begins a line, the line is justified slightly so that the character following the punctuation is placed where the first character of the line normally is placed. For instance, if the node "One" began a line, the character "O" might be positioned one inch from the left side of the page. However, if the node ""One" began the line, the character "" " may be justified to the left so that the character "O" was still positioned one inch from the left side of the page. The same correction technique illustrated in FIG. 9 could be used to dynamically define the width of nodes that begin a line. However, step 234 in FIG. 9 would be changed to ask whether the node begins a line.

Similarly, optical edge adjustment techniques may require that the widths of beginning nodes of lines in a paragraph be defined using a process similar to that in FIG. 9. Optical edge adjustment techniques recognize that justifying some particular characters slightly, can enhance the visual perception of the layout. For instance, if the character "L" is placed at the beginning of a line, it might be placed one inch from the left side of the page. However, the character "W" may appear to be indented slightly if it begins a line and is placed one inch from the left side of the page. Therefore, the character "W" may be placed, e.g., 0.97 inches from the left side of the page rather than one inch. If this is the case, a correction technique similar to that illustrated in FIG. 9 may be implemented to adjust the width of the node containing, e.g., the character "W", when that node begins a line.

The base node widths may simply define the widths of given nodes without any corrections (i.e., the width of the base node can be the width from the beginning of the node to the end of the node). Alternatively, the base node widths may define the widths in terms of the distance from the beginning of the text to the end of the given node. For instance, if each node's base width is defined in terms of the distance from the beginning of the text, line length calculations may be simplified. If each node's base width is defined in terms of the distance from the beginning of the text, the base length of the text on a current line can be calculated, e.g., simply by subtracting the width of the last node of the current line from the width of the node that ends the line immediately preceding the current line.

In one particular implementation, the process starts with a list of character widths and kern pair adjustments. These respective widths are then used to calculate potential left pieces and potential right pieces of a given word. Then, the width of potential end nodes are calculated. For instance the word "kangaroo_" would have a start list of characters {k, a, n, g, a, r, o, -, <space>} each having a defined width, and a list of kern pairs {ka, an, ng, ga, ar, ro, oo, n-, a-} each having a defined kern pair adjustment. These variables are used to calculate the widths of potential left pieces {kan-, kanga-} and potential right pieces {garoo_, roo_}. Moreover, the potential end nodes of a line {kan-, ga-, roo} can be calculated using combinations of the variables mentioned above and combinations of the calculations mentioned above. At this point, sufficient data is available for a system to dynamically define the width of the given nodes in the word "kangaroo_" whether or not any of the nodes are positioned at the end of a line.

After dynamically defining the node widths, the calculated widths and calculated correction widths can be used to calculate the length of a line of text. The first node in the line of text has a width corresponding to its base node width plus the adjustment width that accounts for the fact that the node is beginning a line. The last node in the line of text has a width corresponding to its base node width plus the adjustment width that accounts for the fact that the node is ending a line. The rest of the nodes in the line simply have widths corresponding to their respective base node widths. Thus, the length of the whole line can be calculated simply by summing the respective widths used for the respective nodes of the line. Alternatively, if the base widths are defined in terms of the distance from the beginning of the text, the width of the whole line can be calculated by starting with the base width of the node ending a line, adding the ending correction component for that node that ends the line (or subtracting the component depending on how the correction component is defined), subtracting the width of the node that ends the previous line, and adding the beginning correction component of the node that begins the line (again, or subtracting the component depending on how the correction component is defined).

Other implementations operate in a similar manner according to break rules that define how characters should be laid out in a particular language. For example, warichu is a Japanese way of laying out a collection of characters in a small grid according to specific break rules. The invention can be implemented to reflect the break rules of warichu, for instance, to improve automated paragraph layout in Japanese. Moreover, in some languages, such as German, hyphenation may cause spelling changes in the nodes of the hyphenated word. The invention can be implemented to reflect these grammatical rules as well.

Figure 10:
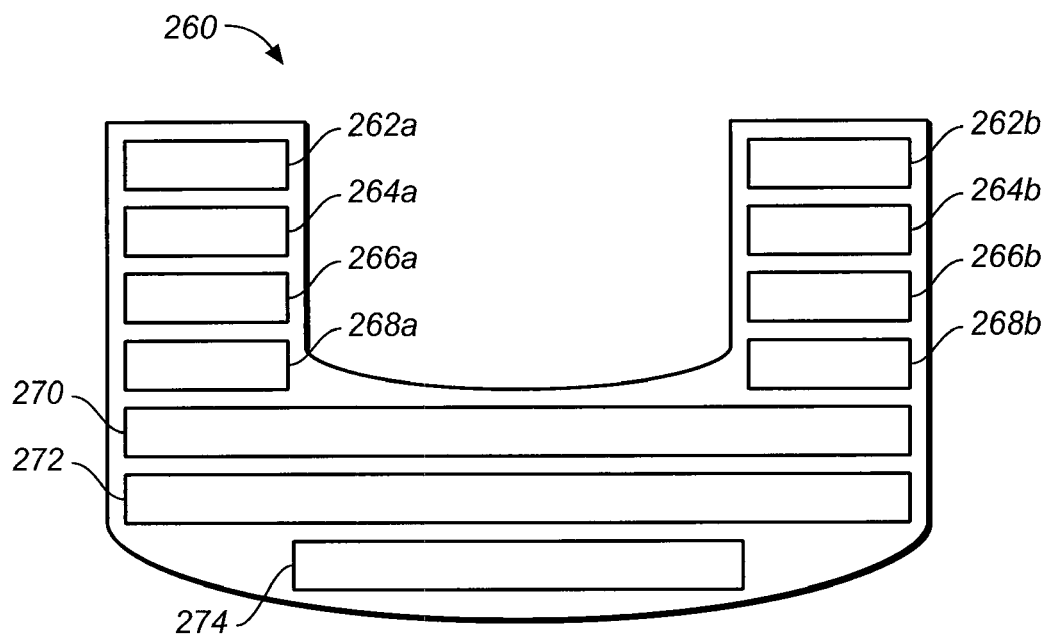
FIGS. 10-12 are exemplary diagrams illustrating three different paragraph cells that contain lines that are broken into more than one tile.
Figure 11:
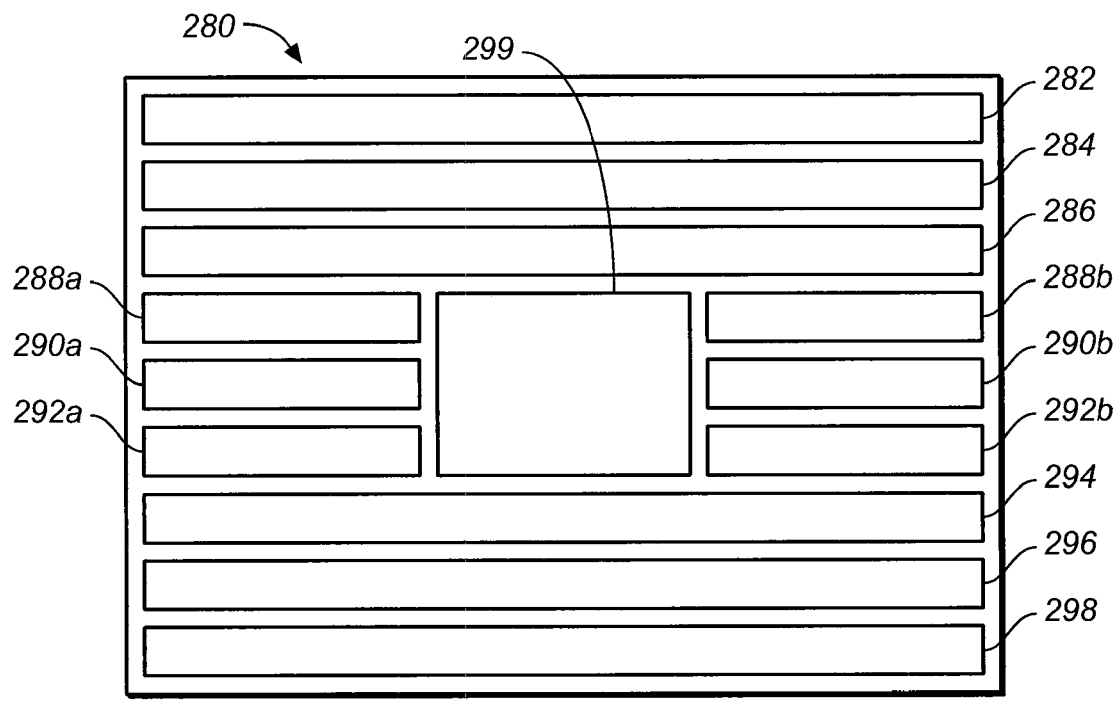
Figure 12:
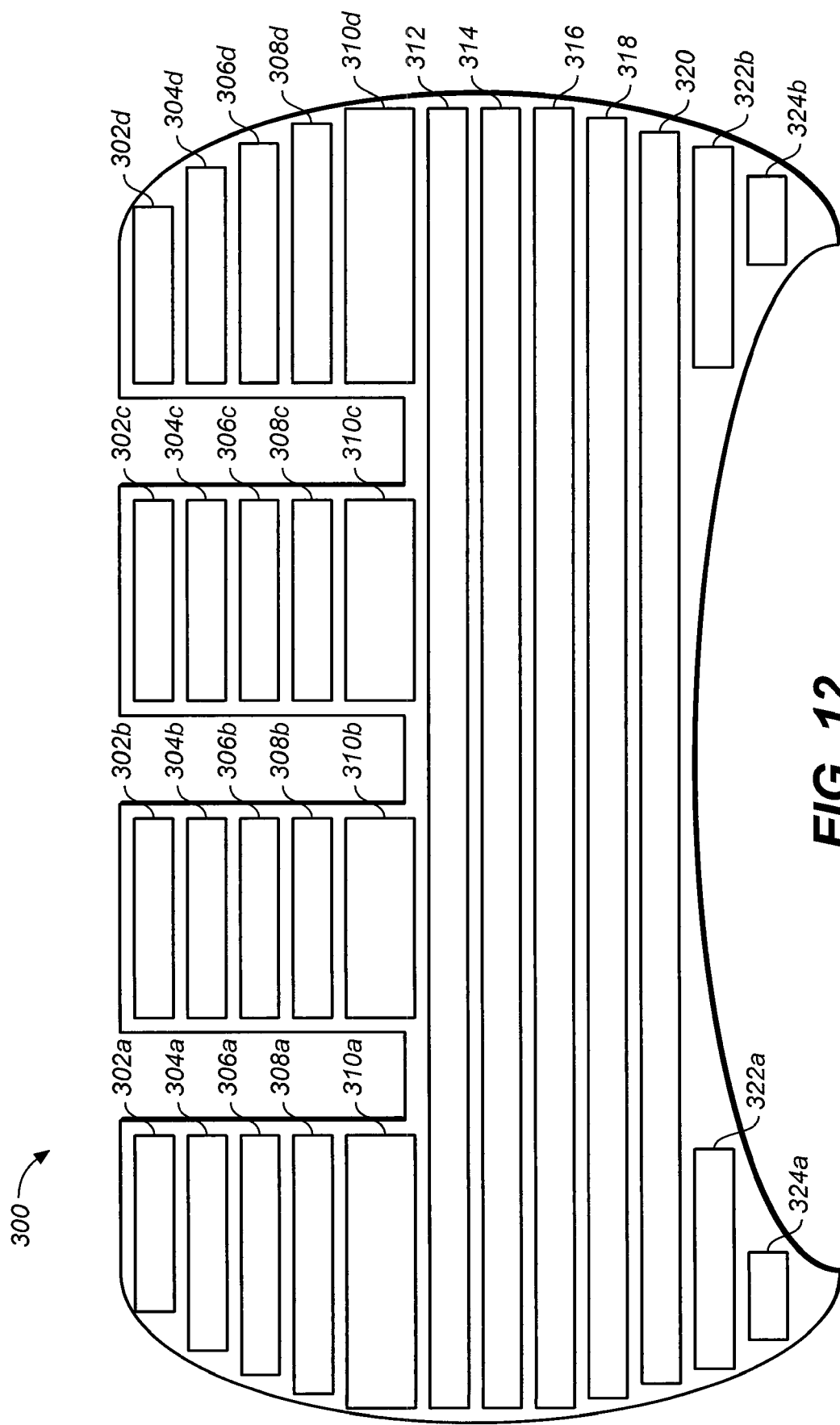

Still additional challenges arise in automated paragraph layout when lines of a paragraph cell are broken into more than one tile. FIGS. 10-12, for instance, illustrate three different exemplary paragraph cells 260, 280, and 300 that contain lines that are broken into more than one tile. In FIG. 10, paragraph cell 260 contains lines 262, 264, 266, 268, 270, 272 and 274. Line 262 is broken into tiles 262a and 262b. Line 264 is broken into tiles 264a and 264b. Line 266 is broken into tiles 266a and 266b, and line 268 is broken into tiles 268a and 268b.

In FIG. 11, paragraph cell 280 contains lines 282, 284, 286, 288, 290, 292, 294, 296 and 298. These lines are arranged around island 299. Line 288 is broken into tiles 288a and 288b. Line 290 is broken into tiles 290a and 290b, and line 292 is broken into tiles 292a and 292b. Island 299, for instance may define an area for placement of an image or other text.

In FIG. 12, paragraph cell 300 contains lines 302, 304, 306, 308, 310, 312, 314, 316, 318, 320, 322, and 324. Line 302 is broken into tiles 302a, 302b, 302c and 302d. Line 304 is broken into tiles 302a, 302b, 302c and 302d. Line 306 is broken into tiles 306a, 306b, 306c and 306d. Line 308 is broken into tiles 308a, 308b, 308c and 308d, and line 310 is broken into tiles 310a, 310b, 310c, 310d. Line 322 is broken into tiles 322a and 322b, and line 324 is broken into tiles 322a and 322b.

Conventionally, if a line is broken into multiple tiles, those tiles are analyzed as though they were individual lines. For instance, a line-by-line technique would define the content of each tile, and then move on to the next. A tree-structure technique would similarly treat each tile as a line of text when choosing the optimal path through the tree, and similarly, dynamic algorithms would treat each tile as a line.

The conventional approach of treating each tile as a separate line, however, poses problems for all of these techniques. For instance, composing one tile at a time can present problems when the height of characters changes. As mentioned above, the height and shape of the characters positioned within the paragraph cell define the respective heights of the different lines in that cell. In other words, any given line must have a height at least as tall as the tallest character in that line. Line 310, for instance, in FIG. 11 illustrates a line with a height greater than the other lines in cell 300. As a given technique analyzes nodes in the reading order of a paragraph, the line's height may need to be increased if a particularly tall character is encountered. For instance, a first node in a line may have 10-point font characters while a second or third node in that same line may have 14-point font characters. When the process encounters the first node, the line only needs to be tall enough to hold 10-point font characters. However, when the process encounters that later node having 14-point font characters, the height of the whole line must change.

Thus, if individual tiles are analyzed as though they were individual lines, when a taller character is encountered, the process may need to back up indefinitely until it reaches the first tile of a given line. This can be inefficient or even ineffective.

Figure 13:
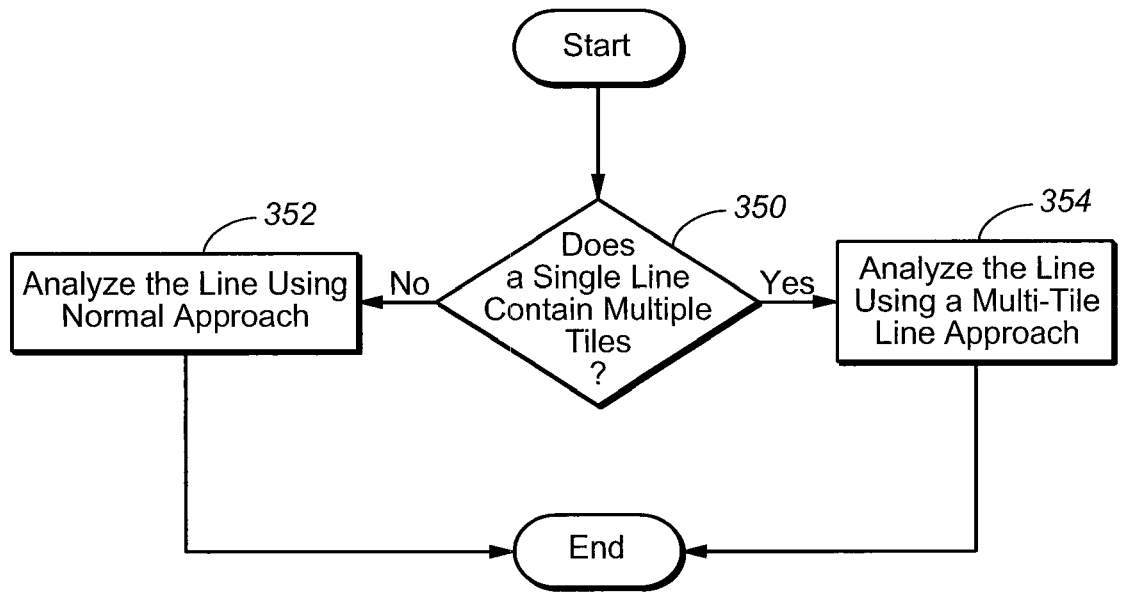
FIG. 13 is a flow diagram illustrating a process of analyzing a paragraph that has at least one multi-tile line.

For these reasons, when a multi-tile line is encountered it is analyzed as a single line with multiple tiles and not a collection of different lines. FIG. 13 is a flow diagram illustrating an exemplary implementation for analyzing a paragraph that has at least one multi-tile line. The process shown in FIG. 13 may form part of a larger process for automated paragraph layout. For instance, a line-by-line technique, a tree structure technique, or a dynamic technique could all implement the process in FIG. 13 to improve the line layout of a line that has multiple tiles.

As shown in FIG. 13, the process considers whether a single line contains multiple tiles (350). If it does not (352), then the line is analyzed using the normal approach for whichever paragraph layout technique is being implemented (e.g., a line-by-line technique, a tree structure technique, or a dynamic technique). If, however, a single line does contain multiple tiles, then that line is analyzed using a multi-tile line approach (354).

Figure 14:
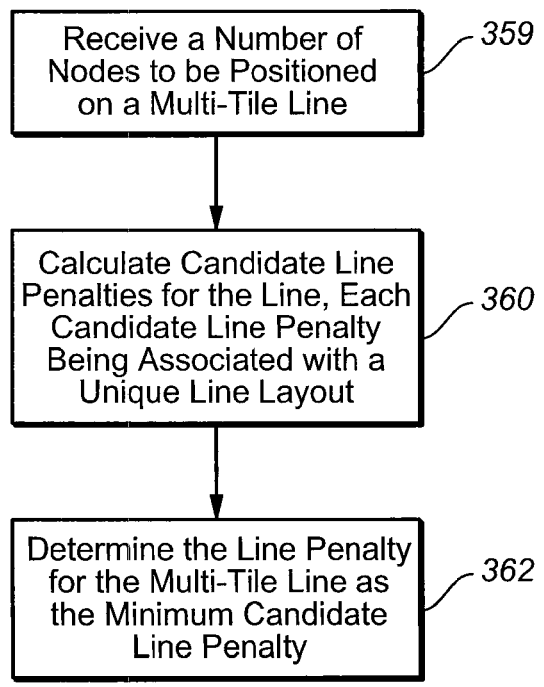
FIG. 14 is a flow diagram illustrating a process for analyzing a multi-tile line.

FIG. 14 is a flow diagram illustrating an exemplary implementation for analyzing a multi-tile line. Again, multi-tile lines may be encountered in a number of different paragraph layout techniques. Thus, the process of FIG. 14 may form part of a larger process for automated paragraph layout. In general, any process where a defined number of nodes are received to be laid out on multiple tiles may implement the process of FIG. 14.

In the process shown in FIG. 14, a defined number of nodes are received (359). For instance, a larger process for paragraph layout may receive the defined number of nodes to be considered for layout on a given line. Once the nodes are received, a number of different candidate line penalties for the line are calculated (360). Each of these respective candidate line penalties is associated with a unique line layout. In other words, for each different candidate line penalty that is calculated, the nodes of the line are positioned on the different tiles to define a unique line layout for that line. Then, once the candidate line penalties have been calculated, the penalty for the multi-tile line having the defined number of nodes is determined according to the candidate line penalty that has the lowest value (362).

An additional process may be implemented to facilitate the defining of different unique line layouts for which line penalties are calculated. One such exemplary process is described below.

The first unique line layout for an N-node line having T tiles has a defined number of nodes positioned on each tile. The defined number may be arbitrarily chosen as the starting point of the process. By way of example, the defined number may be chosen to be N/T so that an equal number of nodes are initially positioned in each tile. If N/T is not an integer, a rounding technique may be used to define the first unique line layout. The process may then consider every possible unique layout where X nodes are removed from one of the tiles and repositioned in a different tile. By way of example, let X=4, then one tile will have N/T−4 nodes and a different tile will have N/T+4 nodes. After all possible movements of X nodes have been considered, the process determines whether any of the unique line layouts have a lower penalty than the first unique line layout. If so, the process continues by removing an additional X nodes from a tile within the unique line layout with the lowest penalty. Again, if this improves the line penalty, still an additional X nodes are removed, and the process continues to repeat itself until a line is defined such that removing an additional X nodes from a tile does not improve the penalty.

The process then performs similar steps on the unique line layout that has thus far yielded the lowest penalty. However, this time X−1 nodes are removed from a tile and repositioned in a different tile. Again, X−1 nodes are removed in a repeated process until the line is defined such that removing an additional X−1 nodes from a tile does not improve the line penalty.

The process then performs similar steps on the respective unique line layouts that have yielded the lowest respective penalties. X−2 nodes are removed from a tile and repositioned until removing an additional X−2 nodes from a tile does not improve the penalty. Then X−3 nodes are removed and repositioned, and then X−4, and so forth. Eventually, a unique line layout is considered where an additional 1 node is removed from a tile and repositioned in a different tile. At this point, once the process of removing 1 node and repositioning the 1 node has been carried out, the unique line layout that yields the lowest penalty is the optimal multi-tile line. The optimal multi-tile line ending in a particular node is therefore defined as the unique line layout that yielded the lowest penalty.

In the example above, X was defined as 4. However, X may be defined as any number. For instance, X may be initially defined as 1, and the subsequent "similar steps" may be performed by incrementing X rather than decrementing X. Moreover, the adjustments to X do not have to be incrementing or decrementing, or even linear. In another implementation, for example, X is originally defined as 5, then 3, and then 1. In another implementation, X is originally defined as 6, then 4, then 3, then 2, and then 1. In still another implementation, X is originally defined as 6, then 1, then 4, then 1 again, then 2, and then 1 again.

First defining X as the largest number of nodes that will be repositioned, and then reducing X for the subsequent steps, is advantageous because it avoids local maximums, and tends to ensure that the optimal layout is discovered. Thus, in general X may be initially defined as a relatively large number so that a relatively large number of nodes may be repositioned early in the process. Then, the number of nodes that are repositioned in subsequent steps may be relatively smaller than the original X. In this manner, local maximums may be avoided.

A system suitable for implementation of techniques for automated paragraph layout can include a processor, user input device, display monitor, memory, storage device, and printer. The system may substantially conform to conventional systems used by graphic artists and other users in the creation of textual and graphic imagery for electronic display or print reproduction. A memory/bus controller and system bus couple processor and memory, while one or more I/O controllers and I/O bus couple the processor and memory to user input device, display monitor, storage device, and printer.

The processor may take the form of a general purpose microprocessor and can be integrated with or form part of a PC, Macintosh, computer workstation, hand-held data terminal, palm computer, cell phone, digital paper, or the like. The user input device may include a conventional keyboard and pointing device such as a mouse, pen, or trackball, if desired. The monitor may include a CRT, flat panel display, or the like, that displays textual and/or graphic information to the user. The memory may include random access memory (RAM) storing program code that is accessed and executed by processor to carry out techniques for automated paragraph layout.

The program code can be loaded into the memory from a storage device, which may take the form of a fixed hard drive or removable media drive associated with the system. For example, the program code can be initially carried on computer-readable media such as magnetic, optical, magneto-optic or other disk or tape media. Alternatively, the program code may be loaded into memory from electronic computer-readable media such as EEPROM, or downloaded over a network connection. The program code may be embodied as a feature in an application program providing a wide range of page layout and content authoring functionality.

A number of implementations of the present invention have been described. Nevertheless, it will be understood that various modifications may be made without departing from the spirit and scope of the invention. For instance, unbreakable segments of characters (nodes) could be defined in any manner. A node could be a syllable, a word, particular words, a character, a symbol, or any combination or any other collection of characters that, for whatever reason, are defined as unbreakable. Accordingly, other implementations and embodiments are within the scope of the following claims.

What is claimed is:

1. A computer-implemented method for automated paragraph layout performed by processing text that is divided into nodes, where each node is an unbreakable segment of characters determined by the language of the text, the method comprising:
   receiving the text having a plurality of nodes;
   calculating a base node width associated with a node, the node ending a line in at least one layout of nodes and not ending the line in at least one layout of nodes;
   calculating, using one or more processors, a correction width for the node;
   using the base node width as the width of the node when calculating a length of a line when the node does not end the line;
   using a sum of the base node width and the correction width as the width of the node when calculating the length of the line when the node ends the line;
   determining a layout of the nodes;
   based upon the determined layout of nodes, controlling layout of the text within one or more paragraphs as automated based at least in part on the calculated length of the line; and
   displaying the automatically laid out text.

2. The method of claim 1, wherein the base node width is defined in terms of a distance from a beginning of the text to an end of the node.

3. The method of claim 1, wherein the base node width is defined in terms of a distance from a beginning of the node to an end of the node.

4. The method of claim 1, wherein calculating the base node width comprises adding character width components to kern pair components.

5. The method of claim 1, wherein calculating the correction width includes accounting for the absence of a space.

6. The method of claim 1, wherein calculating the correction width includes accounting for the width of a hyphen.

7. A computer-implemented method for automated paragraph layout by processing text that is divided into nodes, where each node is an unbreakable segment of characters determined by the language of the text, the method comprising:
   receiving the text having a plurality of nodes;
   calculating a base node width associated with a node, the base node width including at least one character component and at least one kern pair component, the node ending a line in at least one layout of nodes and not ending the line in at least one layout of nodes;
   calculating, using one or more processors, a correction width for the node, the correction width including a space adjustment component and a hyphenation adjustment component;
   using the base node width as the width of the node when calculating a length of a line when the node does not end the line, using a sum of the base node width and the correction width as the width of the node when calculating the length of the line when the node ends the line;

determining a layout of the nodes;

based upon the determined layout of nodes, controlling layout of the text within one or more paragraphs as automated based at least in part on the calculated length of the line; and displaying the automatically laid out text.

8. A computer-implemented method for automated paragraph layout performed by processing text that is divided into nodes, where each node is an unbreakable segment of characters determined by the language of the text, the method comprising:

receiving the text having a plurality of nodes;

calculating a base node width associated with a node, the node beginning a line in at least one layout of nodes and not beginning the line in at least one layout of nodes;

calculating, using one or more processors, a correction width for the node;

using the base node width as the width of the node when calculating a length of a line when the node does not begin the line;

using a sum of the base node width and the correction width as the width of the node when the node begins the line;

determining a layout of the nodes;

based upon the determined layout of nodes, controlling layout of the text within one or more paragraphs as automated based at least in part on the calculated length of the line; and displaying the automatically laid out text.

9. A computer-implemented method for automated paragraph layout performed by processing text that is divided into nodes, where each node is an unbreakable segment of characters determined by the language of the text, the method comprising:

receiving the text having a plurality of nodes;

for each node, calculating a base node width associated with the node;

for each node, calculating, using one or more processors, a first correction width associated with the node if the node ends a line;

for each node, calculating a second correction width associated with the node if the node begins a line;

calculating a length of a line consisting of a sequence of nodes, the calculated length being equal to the total sum of base node widths for the nodes in the sequence, plus the first correction width associated with a last node in the sequence of nodes, plus the second correction width associated with a first node in the sequence of nodes;

determining a layout of the nodes;

based upon the determined layout of nodes, controlling layout of the text within one or more paragraphs as automated based at least in part on the calculated length of the line; and displaying the automatically laid out text.

10. A computer-readable storage device carrying program code for automated paragraph layout by processing text that is divided into nodes, where each node is an unbreakable segment of characters determined by the language of the text, that, when executed:

receives the text having a plurality of nodes;

calculates a base node width associated with a node, the node ending a line in at least one layout of nodes and not ending the line in at least one layout of nodes, calculates a correction width for the node, uses the base node width as the width of the node when calculating a length of a line when the node does not end the line, uses a sum of the base node width and the correction width as the width of the node when calculating the length of the line when the node ends the line;

determines a layout of the nodes;

based upon the determined layout of nodes, controls layout of the text within one or more paragraphs as automated based at least in part on the calculated length of the line; and displays the automatically laid out text.

11. The computer-readable storage device of claim 10, wherein the base node width is defined in terms of a distance from a beginning of the text to an end of the node.

12. The computer-readable storage device of claim 10, wherein the base node width is defined in terms of a distance from a beginning of the node to an end of the node.

13. A computer-readable storage device carrying program code for automated paragraph layout by processing text that is divided into nodes, where each node is an unbreakable segment of characters determined by the language of the text, that, when executed:

receives the text having a plurality of nodes;

calculates a base node width associated with a node, the base node width including at least one character component and at least one kern pair component, the node ending a line in at least one layout of nodes and not ending the line in at least one layout of nodes;

calculates a correction width for the node, the correction width including a space adjustment component and a hyphenation adjustment component;

uses the base node width as the width of the node when calculating a length of a line when the node does not end the line;

uses a sum of the base node width and the correction width as the width of the node when calculating the length of the line when the node ends the line;

determines a layout of the nodes;

based upon the determined layout of nodes, controls layout of the text within one or more paragraphs as automated based at least in part on the calculated length of the line; and displays the automatically laid out text.

14. A computer-readable storage device carrying program code for automated paragraph layout by processing text that is divided into nodes, where each node is an unbreakable segment of characters determined by the language of the text, that, when executed:

receives the text having a plurality of nodes;

calculates a base node width associated with a node, the node beginning a line in at least one layout of nodes and not beginning the line in at least one layout of nodes;

calculates a correction width for the node;

uses the base node width as the width of the node when calculating a length of a line when the node does not begin the line;

uses a sum of the base node width and the correction width as the width of the node when the node begins the line;

determines a layout of the nodes;

based upon the determined layout of nodes, controls layout of the text within one or more paragraphs as automated based at least in part on the calculated length of the line; and displays the automatically laid out text.

15. A computer-readable storage device carrying program code for automated paragraph layout by processing text that is divided into nodes, where each node is an unbreakable segment of characters determined by the language of the text, that, when executed:

receives the text having a plurality of nodes;

for each node, calculates a base node width associated with the node, for each node, calculates a first correction width associated with the node if the node ends a line, for each node, calculates a second correction width associated with the node if the node begins a line, calculates a length of a line consisting of a sequence of nodes, the calculated length being equal to the total sum of base node widths for the nodes in the sequence, plus the first correction width associated with a last node in the sequence of nodes, plus the second correction width associated with a first node in the sequence of nodes;

determines a layout of the nodes;

based upon the determined layout of nodes, controls layout of the text within one or more paragraphs as automated based at least in part on the calculated length of the line; and displays the automatically laid out text.

\* \* \* \* \*